United States Patent [19]

Meraz, Jr. et al.

[11] 3,707,916

[45] Jan. 2, 1973

[54] IGNITER ASSEMBLY

[75] Inventors: Daniel Meraz, Jr.; Anthony J. Simhauser, both of China Lake; Jack A. Yeakey, Ridgecrest; David W. Carpenter, China Lake, all of Calif.

[73] Assignee: The United States of America as represented by the Secretary of the Navy

[22] Filed: July 30, 1970

[21] Appl. No.: 64,919

[52] U.S. Cl. ................ 102/49.7, 102/70.2 A, 60/256

[51] Int. Cl. ............................................F42c 19/12

[58] Field of Search................102/28, 49.7, 70, 70.2; 60/256

[56] References Cited

UNITED STATES PATENTS

| | | | |
|---|---|---|---|
| 2,685,837 | 8/1954 | Sage et al. | 102/70.2 A |
| 2,980,021 | 4/1961 | Adelman | 102/70.2 A |
| 2,989,844 | 6/1961 | Alden et al. | 60/256 |
| 3,062,147 | 11/1962 | Davis et al. | 102/70 |
| 3,125,025 | 3/1964 | Boggs et al. | 102/28 |

FOREIGN PATENTS OR APPLICATIONS

| | | | |
|---|---|---|---|
| 174,755 | 3/1961 | Sweden | 102/49.7 |

*Primary Examiner*—Verlin R. Pendegrass
*Attorney*—R. S. Sciascia and Thomas O. Watson, Jr.

[57] ABSTRACT

An igniter assembly for a rocket motor is positioned within a hollow boss of a heat barrier composed of phenolic asbestos and provided with two gussets for proper orientation and which prevent rotation of four equally spaced igniter ports with the rocket motor propellant grain perforation The igniter assembly comprises a pair of electrical squibs located within sockets in the hollow boss, a booster charger assembly containing booster powder compressed against the electrical squibs, a cross-shaped igniter propellant grain having one end inserted in the booster charge assembly, an igniter cushion to absorb shock, and a closure plug to receive the other end of the propellant grain and to retain the igniter assembly within the hollow boss of the heat barrier.

6 Claims, 2 Drawing Figures

26 24 14 16 12 16 22 16 13 10 26 18 28 29 20 30 34 32

INVENTORS
DANIEL MERAZ, JR.
ANTHONY J. SIMSHAUSER
JACK A. YEAKEY
DAVID W. CARPENTER
BY Thomas O. Watson Jr.
ATTORNEY

IGNITER ASSEMBLY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates generally to improvements in igniters for rocket motors, and more particularly it pertains to a new and improved igniter assembly capable of igniting high flame temperature high density propellants.

Those concerned with the development of igniters for rocket motors have long recognized the need for an igniter of high density propellant grain. Prior art igniters have failed to initiate the grain, and this problem is overcome by the present invention.

SUMMARY OF THE INVENTION

The general purpose of this invention is to provide an ignition system for a high flame temperature, density propellant. This is accomplished by providing an igniter assembly for a rocket motor which is positioned within a hollow boss of a heat barrier composed of phenolic asbestos. The igniter assembly comprises a pair of electrical squibs located within sockets in the hollow boss, a booster charge assembly containing booster powder compressed against the electrical squibs, a cross-shaped igniter propellant grain having one end inserted in the booster charge assembly, an igniter cushion to absorb shock, and a closure plug to receive the other end of the igniter propellant grain and to retain the igniter assembly within the hollow boss of the heat barrier. The heat barrier is provided with two gussets for proper orientation and prevention of rotation of four equally spaced igniter ports adapted to line up with the rocket motor propellant perforations.

OBJECTS OF THE INVENTION

Accordingly, it is an object of the present invention to provide means for igniting high flame temperature, high density propellants with reliability.

Another object is to provide a new igniter made in a simple, compact form which is positive and reliable in operation.

A further object of the invention is the provision of means to prevent the rotation of the grain thereby avoiding a possible clogging of the rocket nozzle.

Other objects, advantages and novel features of the invention will become apparent from the following detailed description of the invention when considered in conjunction with the accompanying drawings.

DETAILED DESCRIPTION OF THE PREFERRED EMBODIMENT

Figure 1:
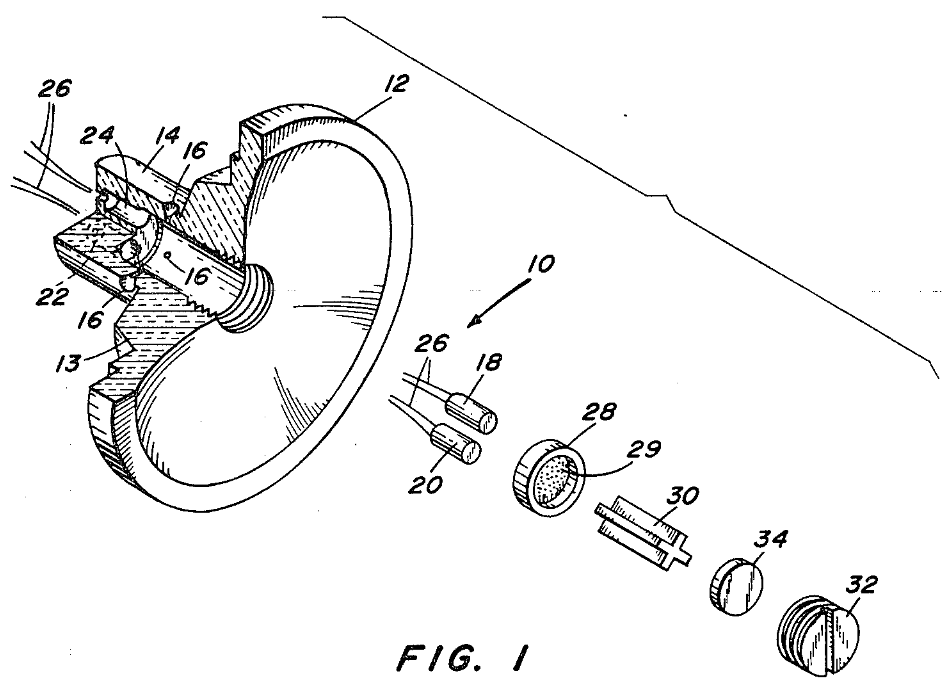
FIG. 1 is an exploded perspective view of the invention.

FIG. 1, which illustrates a preferred embodiment of the invention, shows the components of the igniter assembly 10 in an exploded perspective view. The igniter assembly 10 is positioned within a housing or forward heat barrier 12 composed of material such as phenolic asbestos and which may be formed by a molding and curing process. Gussets 13 are formed on heat barrier 12 to orient igniter ports with rocket motor propellant grain perforation. The forward heat barrier 12 acts as an insulation between the igniter grain 30 and the warhead (not shown). In its central portion, the heat barrier 12 is provided with a hollow boss 14 extending outwardly from the heat barrier, the heat barrier 12 and boss 14 being preferably molded as a unit from a material such as phenolic asbestos.

A pair of electrical squibs 18 and 20 are closely fitted within sockets 22 and 24, respectively, formed in the aft end of hollow boss 14, and the latter has openings through which wires 26 extend from the squibs for conducting current thereto.

A booster charge assembly 28 containing booster powder 29 is compressed in the boss 14 against squibs 18 and 20. The booster charge assembly 28 comprises a cup-shaped annular ring of aluminum in which the booster powder or ignition charge 29 of magnesium, Teflon, Viton powder is placed. Aluminum foil is used to seal the booster powder 29 in the central portion of the annular ring.

Figure 2:
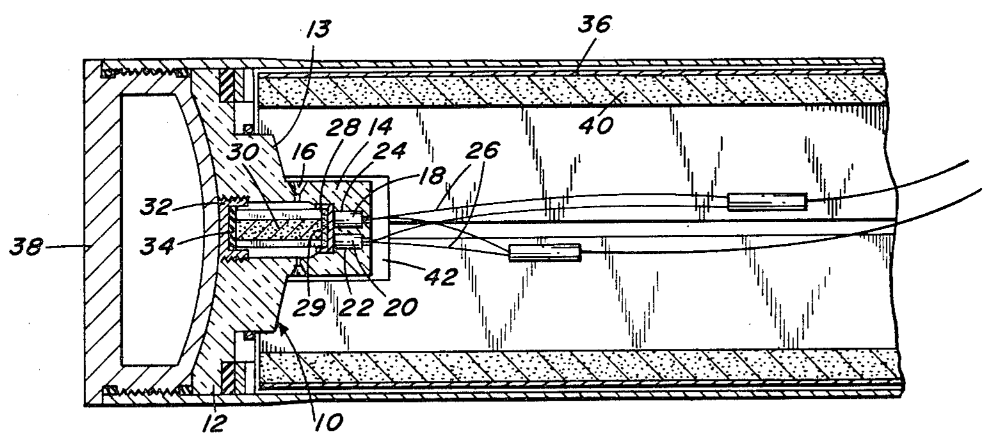
FIG. 2 shows a longitudinal sectional view of a part of a rocket motor embodying the new igniter assembly of the present invention.

Igniter propellant grain 30, having a symmetrical cross-shaped cross section, is inserted into the recess of booster charge assembly 28 as shown in FIG. 2. This assembly is placed within the heat barrier 12, compressed against squibs 18 and 20.

To retain the components of the igniter assembly 10 within the hollow boss 14 of the forward heat barrier 12 a closure plug 32, molded from a material such as asbestos phenolic, is screw threaded into the forward end of the heat barrier 12 to form a flush surface therewith.

In order to take up any tolerance of the igniter assembly 10 and to cushion against vibrational shock, an igniter cushion 34 is placed inside the closure plug 32 before assembly as shown in FIG. 2. The cushion 34 may be formed of silicone sponge rubber or fibrous glass.

The igniter assembly 10 is adapted for use in a rocket motor (FIG. 2) comprising a hollow cylindrical body 36 which is internally threaded at its forward end for connection to member 38. Within the rocket motor body is a cylindrical propellant 40 having an axial passage 42 formed therein. As shown in FIG. 2, the igniter assembly 10 is mounted at the front end of the propellant 40 with the hollow boss 14 projecting into the axial passage 42 in the propellant 40 and with the squib wires 26 extending through the passage 42 to a suitable current source (not shown). Gussets 13 formed on heat barrier 12 prevent it from rotating relative to propellant 40.

As a result, when the squibs 18 and 20 are energized, they fire the igniter grain 30 through the booster powder contained in the booster charge assembly 28, and the igniter grain combustion gases exit through the four equally spaced igniter ports, igniting the rocket motor propellant grain.

Obviously many modifications and variations of the present invention are possible in the light of the above teachings.

What is claimed is:

1. An igniter assembly for a rocket motor positioned within a hollow boss of a heat barrier capable of igniting high density propellant, which comprises:

a pair of electrical squibs located within sockets in said hollow boss;

a booster charge assembly containing booster powder compressed against said squibs;

igniter propellant grain having one end inserted in said booster charge assembly;

a closure plug to receive the other end of said propellant grain and to retain the igniter assembly within the hollow boss of the heat barrier; and a plurality of ignitor ports in said hollow boss communicating said propellant grain with said high density propellant to allow said propellant grain to ignite said high density propellant.

2. An igniter assembly as recited in claim 1 wherein said closure plug has an igniter cushion located therein to compensate for dimensional tolerances and absorb vibrational shocks.

3. The device of claim 1 wherein said igniter propellant grain has a cross-shaped cross section with one end thereof adjacent to said booster powder.

4. The device of claim 1 including means to prevent the hollow boss from rotating relative to the high density propellant, to prevent clogging of the ignitor ports.

5. The device of claim 4 wherein said hollow boss is positioned axially inside said high density propellant.

6. The device of claim 5 wherein said heat barrier is formed of phenolic asbestos.

* * * * *